3,246,092
ACCELERATION RESPONSIVE DEVICE
Eugene M. Todd, Doylestown, Pa., assignor to the United States of America as represented by the Secretary of the Navy
Filed Oct. 29, 1963, Ser. No. 319,898
2 Claims. (Cl. 200—61.45)

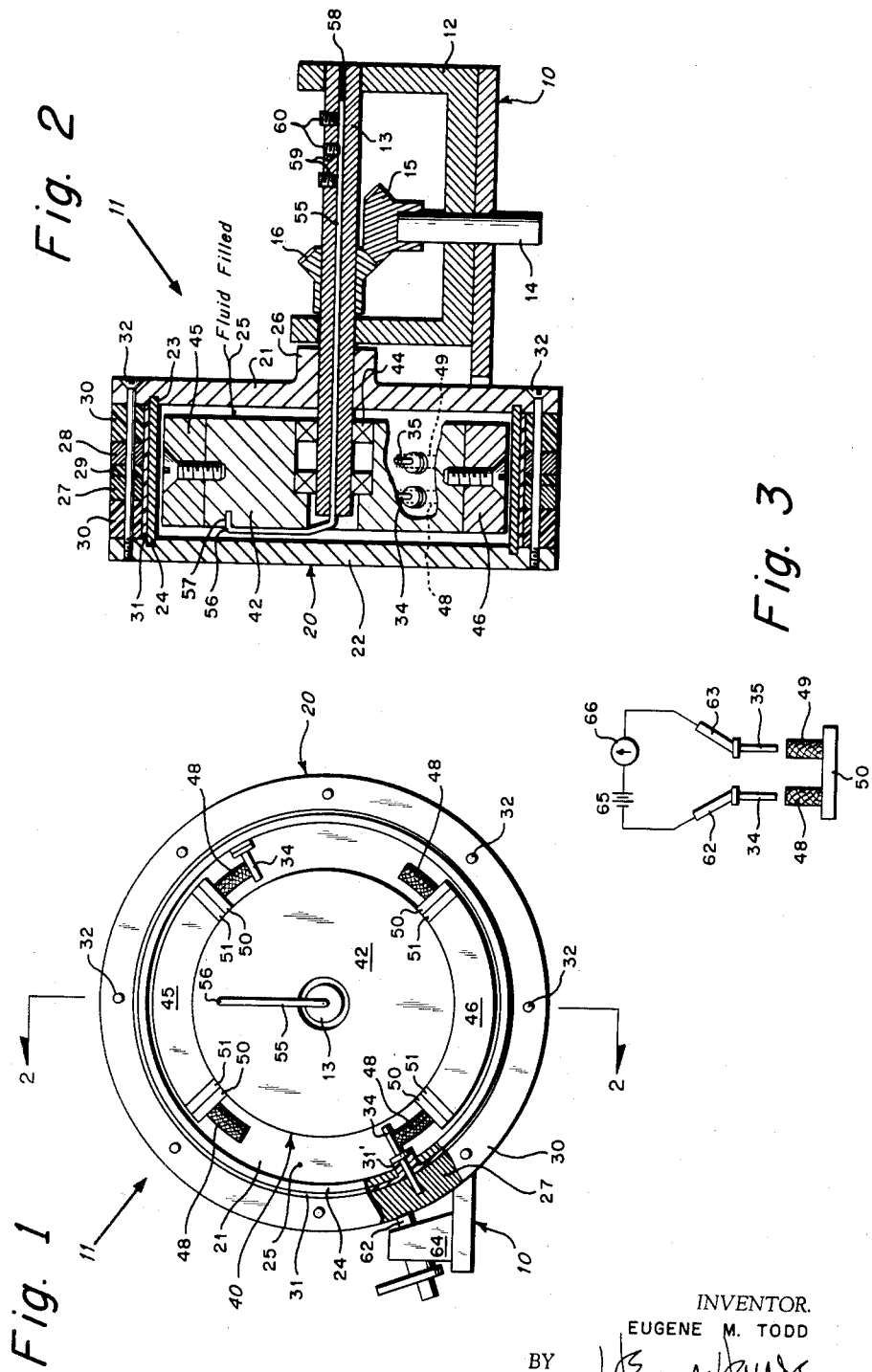
April 12, 1966     E. M. TODD     3,246,092
ACCELERATION RESPONSIVE DEVICE
Filed Oct. 29, 1963
INVENTOR.
EUGENE M. TODD
ATTORNEYS United States Patent Office 3,246,092
Patented Apr. 12, 1966

The invention described herein may be manufactured and used by or for the Government of the United States of America for governmental purposes without the payment of any royalties thereon or therefor.

This invention relates to a rotary acceleration sensing device and more particularly to a monitor which senses and responds when a preset predetermined value of rotary acceleration or deceleration is exceeded.

In the field of air launched tow targetry a combination reel and launcher assembly is secured to the towing aircraft. The reel is capable of towing a 200 pound target at the end of 80 to 100,000 feet of tow line at speeds up to Mach 2. In addition, it is capable of reeling the target in and out at a speed of 60 miles per hour. To accomplish this, a ram air power unit with reversible pitch blades is utilized to drive the reel or tow line storage spool, the pitch of the propeller blades determining reel in or reel out. In order to preclude the power unit, tow line, and target secured thereto from accelerating beyond acceptable limits during the reeling operation an electronic acceleration monitor is provided which energizes an electrical relay when a predetermined value of rotary acceleration is exceeded. This in turn opens a contact and deenergizes the blade pitch change motor to stop the blade rotation, thereby causing a deceleration of the power unit within acceptable ranges of acceleration. Upon reaching these acceptable limits, a blade pitch change motor will again begin to rotate the propeller blades. The cost of the present electronic sensor is extremely high and in view of its complex nature, since transistors, capacitors, resistors, relays, etc. are utilized, the reliability has failed to meet the high operating standards required. Furthermore, electronic monitors have been found sensitive to the temperatures encountered in tow target applications, these temperatures reaching —54° centigrade and introducing serious error in the monitoring operation.

When prior art mechanical rotary accelerometers are utilized within the conditions enumerated above, serious problems of reliability and accuracy arise by reason of the various frictional forces developed therein. High accuracy requirements are further complicated by the oscillating action or "hunting" of the inertial rotary member and by the occurrence of "contact bounce" which occurs when the electrical contacts of the inertial member make contact with the receptive electrical signal contacts. Additionally, the accelerometers require extensive overhaul and rebuilding in order to adjust the ability thereof to indicate when a different predetermined and preset acceleration has been exceeded.

It is an object of the present invention to provide a simple and inexpensive mechanical acceleration sensor for monitoring the rotary acceleration of a rotating element.

Another object of this invention is to provide a mechanical rotary acceleration device for sensing both acceleration and deceleration of a rotating member.

An additional object of this invention is to provide a rotary acceleration sensor of high sensitivity, reliability and accuracy and one which is satisfactorily operated at extreme ranges of temperature conditions.

A still further object of the present invention is to provide an adjustable rotary acceleration sensor for indicating when various predetermined values of acceleration are exceeded.

Various other objects and advantages will appear from the following description of an embodiment of the invention and the novel features will be particularly pointed out hereinafter in connection with the appended claims.

In the drawing:

FIG. 1 is a partially sectioned front view of a present invention with the cover plate removed for purposes of illustration;

FIG. 2 is a cross sectional view taken along line 2—2 of FIG. 1; and

FIG. 3 is a schematic illustration of the electrical elements and circuitry which provide the indication of exceeded acceleration.

Referring now to an embodiment of the present invention and more particularly to FIGS. 1 and 2, the frame assembly generally noted at 10 provides the mounting structure for securing the accelerometer 11 to a supporting structure (not shown) adjacent the object the acceleration of which is to be monitored. A channel member 12 is rigidly secured to the frame assembly 10 and serves as a bearing member for a shaft 13 rotatably mounted thereon. Rotation of the shaft 13 is controlled by the drive shaft 14 which has one end thereof secured to the rotating element (not shown) the acceleration of which is to be monitored by the present invention. The other end of the drive shaft 14 has a mitre gear 15 rigidly secured thereto and engages a complementary mitre gear 16 which in turn is rigidly secured to the shaft 13 and is rotatable therewith so that any rotation of the rod 14 will rotate shaft 13 in a complementary manner.

A housing assembly generally noted at 20 is rigidly secured for rotation to the shaft 13 and includes an inner cover plate 21 and an outer cover plate 22, each having a circular groove 23 formed therein for receiving the edges of an open ended cylindrical member 24 which, together with the cover plates 21 and 22, forms a chamber 25 for receiving an inertial rotor assembly generally noted at 40 to be discussed below. The inner cover plate 21 is additionally provided with a collar 26 which surrounds and rigidly engages shaft 13. This connection may be provided interiorly with a seal, not shown.

Extending outwardly beyond the cylindrical member 24 and between the inner and outer cover plates 21 and 22, respectively, is a pair of slip rings 27 and 28, of brass or other appropriate material, electrically insulated from each other by insulator ring 29 and insulated from the cover plates 21 and 22 by a pair of insulator rings 30 of phenolic or other insulating material. A cylindrical insulating sleeve 31 is interposed between the slip rings 27 and 28 and the metallic cylindrical member 24. Each of the aforementioned elements are retained in their assembled position by fastening means 32 extending therethrough.

Extending interiorly of the chamber 25 is a pair of terminals 34 and 35 each electrically interconnected with slip rings 27 and 28, respectively, and appropriately insulated from the metallic cylindrical member 24 by collar portions 31′ on insulator sleeve 31. Three additional pairs of terminals, not shown, are provided at 90° intervals about the sensor assembly 20 and each of these has electrical communication with the slip rings as described above.

An inertial rotor assembly generally noted at 40 is housed within the chamber 25 and includes a steel rotor member 42 of predetermined area which rotates freely about shaft 13 by reason of a pressed fit bearing assembly 44 interposed between the shaft 13 and rotor member 42. A pair of diametrically opposed 90° ring segments 45 and 46 of predetermined area are rigidly secured to the rotor member 42 and are also constructed of steel or other appropriate material. Each end of the ring segments 45 and 46 has secured thereto a pair of resilient electrical contacts 48 and 49 of gold plated copper wadded wire or other appropriate and similar material for making cushioned contact with the complementary spaced terminals 34 and 35. The resilient contacts 48 and 49 are electrically interconnected by conducting strips 50 and are insulated from the ring segments 45 and 46 by insulating blocks 51.

In order to preclude rotation of the inertial rotor assembly 40 relative to the housing assembly 20 except under predetermined and preset conditions of acceleration of the drive shaft 14, a torsional spring member 55 is connected at one end 56 in a slot 57 formed in the rotor member 42 and has the remaining portion thereof passing through a coaxial bore 58 formed in the shaft 13. A series of longitudinally spaced tapped holes communicate with the coaxial bore 58 and plugs 60 communicating with the torsional spring member 55 provide means for varying and adjusting the torsional characteristics of the spring member 55 and thereby vary the amount of acceleration necessary to urge the rotor assembly 40 and the contacts associated therewith into engagement with the terminals 34 and 35. It should be noted that the torsional spring member 55 is initially engaged and positioned in such a manner that the resilient contacts 48 and 49 on the rotor assembly 40 are equidistant from the terminals 34, 35 when the accelerometer is in the unstressed or no load condition.

The chamber 25 contains a viscous damping fluid such as silicone or the like of preselected and predetermined viscosity. The clearance between the rotor assembly 40 and its enclosure 20 is sized to develop the desired viscous shear stress in the fluid in order to critically dampen any oscillation that might occur. The shearing area and the fluid viscosity of the silicone oil are all evaluated and determined for the purpose of obtaining critical damping, that is to obtain an accurate indication of the acceleration in the shortest length of time. Critical damping is desired in opposition to overdamping or underdamping since underdamping will provide overshoot or shaft oscillation of too great a value and an extended period of time will elapse before a true and accurate value of acceleration could be determined. In the case of overdamping, although an accurate acceleration value will be reached without undue oscillation of the rotor assembly 40, this will be obtained in a slow, continued manner which will result in the elapse of a prolonged period of time.

A pair of brushes 62 and 63 constructed of a material similar to the contacts 48 and 49 are mounted on a brush holder 64 for contacting the slip rings 27 and 28, respectively. One of the brushes 62 is secured electrically to the source of supply indicated at 65 in FIG. 3 and the other brush is electrically connected to an indicator known in the art and indicated at 66. It is understood that although an indicator is illustrated in FIG. 3 for sensing the acceleration, various other means such as switches, relays, etc. may be substituted.

In operation, the accelerator sensor 11 is coupled to an input shaft, not shown, for purposes of measuring or indicating the acceleration of this shaft and the appropriate measuring, indicating or control unit 66 is electrically connected to the brushes 62 and 63. When this input shaft rotates at a constant velocity, that is where there is no acceleration or deceleration, the drive shaft 14 will rotate at a velocity equal or proportional to that of the input shaft. This rotary motion is transferred by the mitre gear set 15, 16 through shaft 13 to the housing assembly 20 wihch will also rotate at a proportional rotational velocity. Under these conditions of constant velocity input, assembly 40 will also rotate with the housing assembly due to the connection of spring 55 with the rotor 42 and shaft 55. When there is a change in the velocity of the drive shaft 14, that is where there is an acceleration or deceleration of the shaft to be monitored, this motion will be transmitted immediately to the housing assembly 20. However, due to the effects of inertia assembly 40 will continue to rotate at the prior initial and constant velocity thereby creating a differential in velocity between the assembly 40 and the housing assembly 20 which will be reflected by a rotary translation and subsequent contact of the contacts 48, 49 with the terminals 34 and 35. By reason of this contact, and the existence of conducting strip 50, the circuit will be closed and an appropriate indication at 66 will be noted. Due to the construction of the resilient contacts and the cushioning effect thereby obtained the rotor assembly 40 will not "bounce" and the contacts will remain in engagement with their respective terminals until the speed of the input shaft is corrected.

It will be understood that various changes in the details, materials, steps and arrangements of parts, which have been herein described and illustrated in order to explain the nature of the invention, may be made by those skilled in the art and within the principle and scope of the invention as expressed in the appended claims.

What is claimed is:
1. An angular accelerometer for sensing a change in the velocity of a revolving body above a preset value comprising:
   a supporting member;
   shaft means journaled for rotation within said supporting member, said shaft means having a coaxial bore extending along the length thereof and a plurality of radially extending adjustment ports spaced along a portion of the length of said shaft adjacent one end of said shaft;
   adjustment plugs positioned within said ports;
   means associated with said shaft for rotating the same in relation to the velocity of the revolving body;
   a housing rigidly secured to said shaft for rotation therewith, said housing being filled with a damping fluid;
   an inertial member within said housing and rotatably secured to said shaft for rotation thereabout;
   a torsion spring having one end rigidly secured to said inertial member and having the other end thereof passing through said coaxial bore and rigidly secured to said one end of said shaft means by one of said adjustment plugs thereby establishing the preset value;
   a pair of spaced slip rings secured about the periphery of said housing, said slip rings being electrically insulated from each other;
   two pairs of diametrically opposed terminals secured to said housing, each terminal of said pair being connected to one of said slip rings and extending within said chamber;
   pairs of resilient contacts secured to said inertial member at 90° intervals for cushioning engagement with said terminals when the change in velocity of the revolving body exceeds said preset value, each contact of said pair being electrically connected to the other contact of said pair;
   brush means secured to said supporting means for engaging said slip rings;

said torsion spring normally maintaining said resilient contacts angularly displaced from said terminals;

and normally opened circuit means associated with said brushes for indicating excessive changes in the velocity of the revolving body.

2. The angular accelerator of claim 1 wherein said resilient contacts are formed of wadded gold-plated copper wire.

References Cited by the Examiner

UNITED STATES PATENTS 2,938,094  5/1960  Nass _____ 200—164
2,976,378  3/1961  Goddard _____ 200—61.45

FOREIGN PATENTS 155,847  3/1954  Australia.

BERNARD A. GILHEANY, *Primary Examiner.*
JOSEPH J. BAKER, *Assistant Examiner.*